United States Patent [19]

Salisbury et al.

[11] 4,066,138

[45] Jan. 3, 1978

[54] EARTH BORING APPARATUS EMPLOYING HIGH POWERED LASER

[76] Inventors: Winfield W. Salisbury, 11 Glenn Road, Belmont, Mass. 02178; Walter J. Stiles, 4032 W. Krall Ave., Phoenix, Ariz. 85019.

[21] Appl. No.: 750,875

[22] Filed: Dec. 15, 1976

Related U.S. Application Data

[63] Continuation-in-part of Ser. No. 525,442, Nov. 10, 1974, Pat. No. 3,998,281.

[51] Int. Cl.² .............................................. E21B 7/14
[52] U.S. Cl. ...................................... 175/16; 175/60; 299/14
[58] Field of Search ...................... 299/14; 175/11, 16, 175/15

[56] References Cited

U.S. PATENT DOCUMENTS

| 914,636 | 3/1909 | Case | 175/15 X |
|---|---|---|---|
| 2,548,463 | 4/1951 | Blood | 175/15 X |
| 3,539,221 | 11/1970 | Gladstone | 175/16 X |
| 3,544,165 | 12/1970 | Snedden | 175/16 X |
| 3,556,600 | 1/1971 | Shoupp et al. | 175/16 X |
| 3,693,718 | 9/1972 | Stout | 175/16 |
| 3,882,945 | 5/1975 | Keenan | 175/16 |
| 3,998,281 | 12/1976 | Salisbury et al. | 175/16 |

OTHER PUBLICATIONS

"Novel Drilling Techniques" by William C. Maurer, Mar. 1968, N.Y. Pergamon Press.

Primary Examiner—Ernest R. Purser
Attorney, Agent, or Firm—J. Patrick Cagney

[57] ABSTRACT

Earth boring apparatus is mounted above ground and directs an annulus of high powered laser energy downwardly for boring a cylindrical hole by fusing successive annular regions of the stratum to be penetrated at a power level that shatters and self-ejects successive cores from the hole. A first fluid blast above the hole deflects the ejected core as it exits from the hole. A second fluid blast above the hole ejects fluid to provide adequate fluid at the strata to be penetrated prior to actuation of the laser for promoting a thermal shock capable of shattering and ejecting the core.

Optical sensing separately detects the core shattering and the core ejection to control timed actuation of the system components.

7 Claims, 5 Drawing Figures

EARTH BORING APPARATUS EMPLOYING HIGH POWERED LASER

RELATED APPLICATION

This application is a continuation-in-part of pending application Ser. No. 525,442 filed Nov. 10, 1974 and entitled Earth Boring Method Employing A High Powered Laser now U.S. Pat. No. 3,998,281, the disclosure of which is specifically incorporated herein by this reference.

BACKGROUND OF THE INVENTION AND CROSS REFERENCE TO RELATED PRIOR ART

High powered lasers are presently in an extremely active stage of development and it has already been proposed to use such lasers in various earth working applications. Examples may be found in the following two U.S. patents:

| Snedden | Pat. No. 3,544,165 | 1970 |
| Gladstone | Pat. No. 3,539,221 | 1970 |

The problem in attempting to apply the teaching of such patents to drilling, for example a hole 30 cm. in diameter and 5 km. deep is that even by using the most advanced form of lasers known today too much energy would probably be required to vaporize a cylinder of that size from the earth's crust. Some other approach therefore, seems necessary in order to reduce the total amount of energy input required and hence the cost for boring a hole this size.

BRIEF SUMMARY OF THE INVENTION

The present invention solves the problem by focusing and/or scanning a laser beam or beams in an annular pattern directed substantially vertically downwardly onto the strata to be bored. The actual annular area to be vaporized by the laser beam therefore, would be only a small fraction of the total diameter of the hole. By pulsing the laser beam, alternatively with a fluid blast on the area to be bored, not only will the annulus be vaporized, but the core of the annulus will be shattered by thermal shock and the pressure created on the underside by the vaporization of the annular area will be sufficient to raise the core material to the surface in fragments. The horizontal component of the fluid blast pulsed alternately with the laser beam will also deflect the core material away from the drilling apparatus.

More particularly, the invention provides apparatus for boring a cylindrical hole in the earth and comprising laser means for providing a beam of high powered coherent light, focusing means above the hole for forming the beam into an annular beam traversing a downwardly directed path, fluid blast deflecting means for directing a blast that intercepts the path above the hole, and control means connected to actuate the laser means and deflecting means in sequence to provide annular beam pulses that form the hole by fusing successive annular regions of the stratum to be penetrated at a power level that shatters and self-ejects successive cores from the hole and to provide fluid blasts that deflect ejected cores.

In view of the power limitations of currently available lasers, the presently preferred arrangement comprises a plurality of lasers symmetrically disposed about a common center, the focusing means includes nutating means at the common center, and the control means includes synchronizing means for pulsing the lasers in a timed sequence with the movement of the nutating means for sequentially intercepting a beam pulse from each laser and deflecting the same into a circular pattern constituting a composite of the individual beam pulses.

The control means preferably includes optical sensing means located on the center line of the path traversed by the annular beam for detecting ejection of a shattered core and actuating the deflecting means in timed relation to core ejection.

The optical sensing means also serves to detect shattering of a core for controlling turn-off of the laser pulses for automatically determining the length of the laser pulse in accordance with the physical properties of the strata being bored.

A separate fluid blast injection means is provided at the top of the hole for injecting fluid, as necessary, to provide adequate fluid at the strata to be penetrated prior to laser actuation for promoting a thermal shock capable of shattering and ejecting the core. The control means is connected to actuate the injection means in timed relationship to the laser.

Other features and advantages of the invention will be apparent from the following description and claims and are illustrated in the accompanying drawings which show structure embodying preferred features of the present invention and the principles thereof, and what is now considered to be the best mode in which to apply these principles.

BRIEF DESCRIPTION OF THE DRAWINGS

In the accompanying drawings forming a part of the specification, and in which like numerals are employed to designate like parts throughout the same.

DETAILED DESCRIPTION OF THE DRAWINGS

To give a detailed description of the present invention let us assume that what we want to produce is a vertically arranged cylindrical hole in the earth's crust approximately 30 cm. in diameter and 5 km. long. The volume of such a hole would be 350 cubic meters. Further assuming that the approximate density of the material to be removed to form such a hole is 3, for a slightly heavy rock, this would be about $10^6$ kilograms of rock to be melted and vaporized or roughly 1,000 long tons. Further assuming an average heat capacity of 2/10 calories per gram per degree centigrade, and a combined heat of fusion and vaporization of about 100 calories per gram, the process would require $17 \times 10^{12}$ Joules if the drilling could proceed fast enough locally so that conduction losses would be relatively negligible.

The energy equivalent to do the job can be calculated to be 4.8 × 10⁶ kilowatt hours. If we could operate a 10 megawatt laser for approximately 20 days continuously, it would do the job but even at a cost of $0.05 per kilowatt hour, this would still represent about $240,000.00 worth of energy alone. Other factors which were eliminated from the calculation to simplify it are things such as laser efficiency and thermal losses during the drilling. In order to greatly reduce the energy required, the present invention proposes a means for concentrating the energy of a laser beam into an annular pattern for example, about 1 cm. wide and having an outer diameter equal to be desired diameter of the bore hole. Secondly, the present invention contemplates pulsing the laser beam so as to obtain very high peak powers for short time durations to promote thermal shock of the core material within the annulus and thus break the core up into small particles which will be forced upwardly out of the hole by the pressure of the material which is actually vaporized by the laser beam. With this approach, the mass of matter required to be vaporized by the laser beam could be reduced by a factor of about 7¾, resulting in an energy cost reduction to about $31,000.00.

Figures 1, 2, 3:
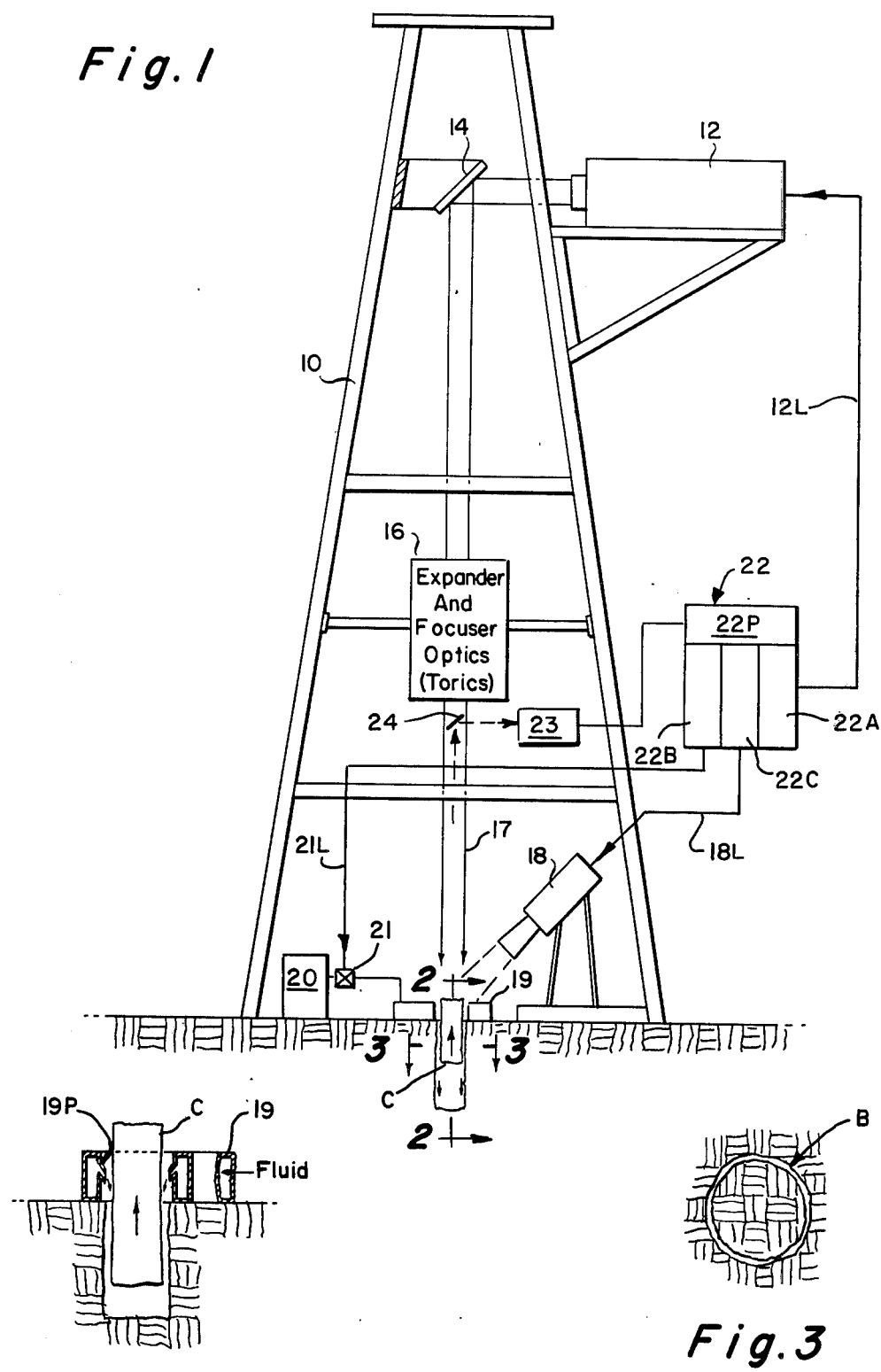
FIG. 1 is a diagrammatic view in side elevation to illustrate the basic system of the present invention.
FIG. 2 is a showing of one possible configuration of a nozzle for directing the fluid blast into the area being bored.
FIG. 3 is a section on the lines 3—3 of FIG. 1 indicating the configuration of the bore hole as it is initially formed in the earth by vaporization of the earth crust by the laser beam alone.

Referring now to FIG. 1 of the drawings, one possible arrangement for practicing the present invention is diagrammatically illustrated. An oil well drilling tower or derrick 10 is positioned as usual over the area to be drilled. A laser 12 is shown as supported by the drilling derrick, but obviously it could be independently supported immediately adjacent the derrick. Coherent light from the laser 12 is reflected vertically downwardly as indicated at 14. In order that the laser beam will have an annular pattern when it reaches the surface of the ground, an optical system generally indicated at 16 is employed. Reflector optics which can be fluid cooled are ideal for this purpose and a discussion of such devices may be found in an article entitled "Toric Catoptrics" by D. S. Bank at pages 13–19 inclusive of a publication entitled "Electronic Progress" Volume 17, Number 2, Summer 1974, published by Raytheon Company. Any conceivable type of focusing is possible employing the optical principles set forth in the publication including such features as "Zoom" focusing and the like.

As indicated in FIG. 3, the shape of the coherent light beam B exiting from the optical system 16 may then be annular and the thickness of the annulus may be accurately controlled.

According to the invention, the annular beam B traverses a downwardly directed path 17 to fuse successive annular regions of the stratum to be penetrated at a power level that shatters and self-ejects successive cores C from the hole.

Deflector means in the form of a fluid blast device as shown at 18 is directed to intercept the path above the hole to deflect the ejected core as it exits from the hole.

Injector means in the form of a fluid blast device as shown at 19 is directed to supply expansion fluid to the strata to be penetrated prior to fusing thereof by the laser beam for promoting core shattering and ejection.

The injector means 19 is in the form of a spiral duct encircling the top of the hole and having a downwardly directed annular port 19 P facilitating the delivery of the expansion fluid to the bottom of the hole. A pressurized storage tank 20 for the expansion fluid is shown connected through a control valve 21 that is operated in timed relation to the laser for supplying expansion fluid to the strata to be penetrated prior to fusing thereof by the laser beam.

The expansion fluid is selected having regard to the fusing and shattering of the core and thus may have properties which would aid in the glassification of the bore wall. For example, if pure dry silicon sand were the material being bored, the fluid would include sodium or calcium compounds to assist in the fusing and glassification incident to the core formation and required for optimizing the bore wall characteristics. This fluid is preferably introduced as a blast in order to reduce the time intervals required for delivery to the base of the bore and it may be gaseous or liquid depending upon the particular conditions of the earth boring operation.

By pulsing a suitably high energy laser beam upon an annular region of the strata not only will the material in the annulus be vaporized, but the core encircled by the annulus will be shattered by thermal shock and the pressure created on the underside of the shattered core resulting from the vaporization of the annular area will be sufficient to eject the core to the surface either as a unit or in fragments.

In the drawings, a core is represented as being ejected in FIGS. 1 and 2, wherein the core is pictured as being a coherent cylinder C. Such a unitary ejection core can be expected in the case of materials such as limestone. However, materials such as sand or schist or certain slate configurations may be expected to shatter and come out as separate particles which will emerge together and then disperse.

In the practice of this invention, the variations in the material encountered in a typical earth boring operation can all be accommodated. In the case of dry sand material or hard rock having no water of crystallization, a fluid must be provided in the base of the bore immediately adjacent the strata to be penetrated in order to respond to the incident laser energy to develop the desired shattering and ejection of the core. In other instances where rock having water of crystallization or where isolated water pockets are encountered, separate introduction of expansion fluid into the bore is not necessary. In still other situations where a cave of water may be encountered, depending on the magnitude, the laser energy source may be used for vaporizing the water body or other techniques already known in the earth boring field may be employed for isolating the water filled region to permit subsequent boring therebelow.

The invention recognizes that the energy input rate and the time duration of the laser pulse is subject to variation depending upon the particular materials and circumstances encountered. The worst case situation of hard rock, free of water of crystallization and having a density of approximately 3, is dealt with herein. For such conditions, laser pulses of 10 megawatt energy level can produce fusion conditions capable of causing shattering and ejection of the core for achieving a drilling rate that is commercially satisfactory. The 10 megawatt power level is given here relative to a bore hole of 30 cm. diameter and 1 cm. beam width. Lower energy levels will produce a lower rate while still achieving the shattering and ejecting function. The specific threshold value at which the shattering and ejection function would occur for each particular material requires further investigation. At the present time, the total laser energy levels contemplated herein for the single laser source 12 shown in FIG. 1 exceed the power output capabilities of an off-the-shelf commercial laser. Techniques are disclosed in FIG. 4 for utilizing a plurality of lasers of currently available types to develop cumulative pulse power capable of producing the core shattering and ejecting function.

Figure 4:
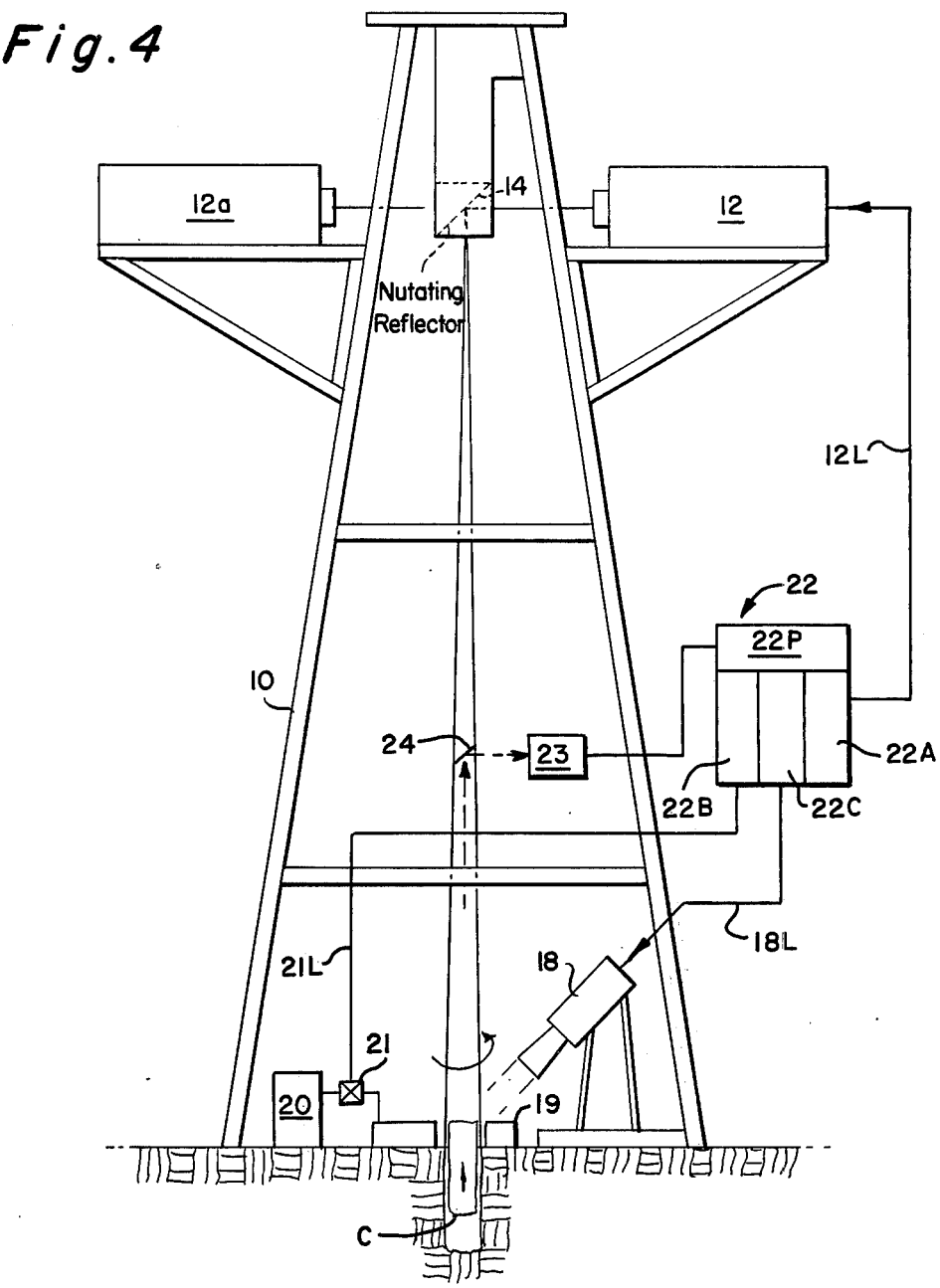
FIG. 4 is a view similar to FIG. 1 in which the laser beam is caused to scan in a circular path to create an annular pattern in the working area.

The system shown in FIG. 4 is similar to the one shown in FIG. 1 except that the laser beam instead of being focused into an annular pattern is focused to a point and the point is then caused to scan in an annular pattern. One way of achieving this is shown schematically in FIG. 4 as a means for causing the mirror 14 to nutate. Also as shown in this Fig., additional lasers such as indicated at 12a may be employed so that a plurality of beams will be scanned around the annulus.

Figure 5:
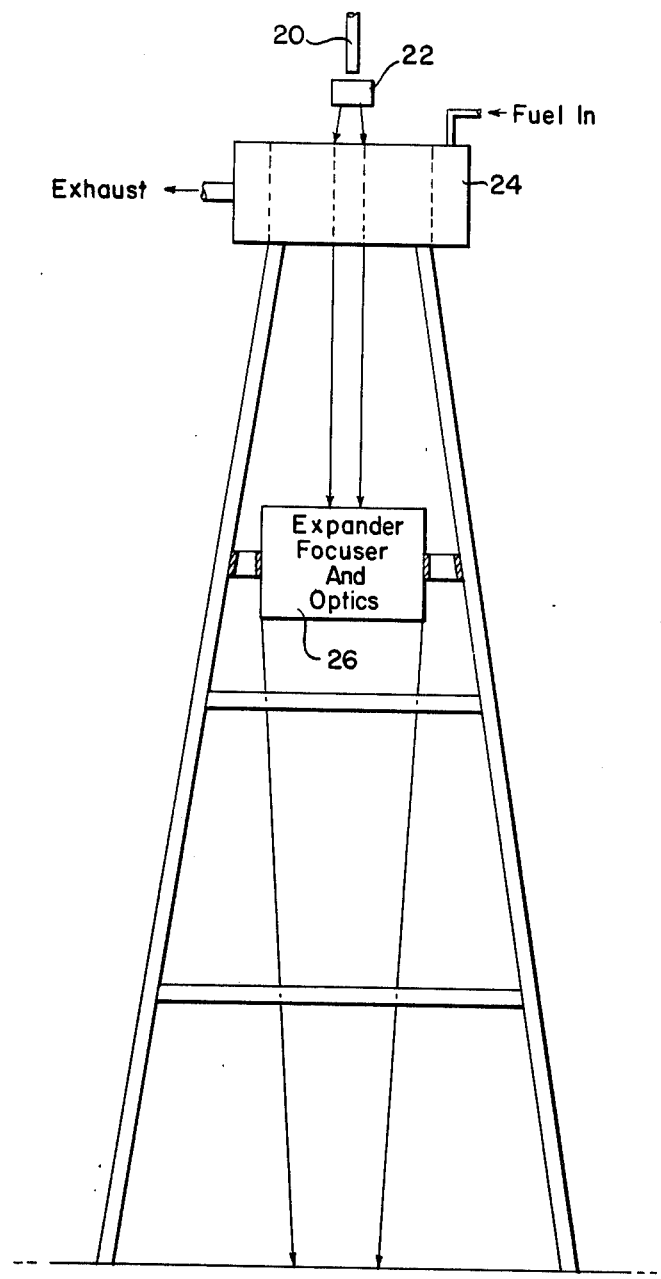
FIG. 5 is a view similar to FIG. 1 but showing an electrical laser with a gaseous fuel, light amplifier to achieve a coherent light beam of the desired energy.

In FIG. 5, a further alternative to the energy sources depicted in FIGS. 1 and 4 as shown. In this case, the source of coherent light may be an electrical laser 20, the output of which goes through a beam expander 22 and the through a light amplifier 24 of the so-called T.E.A type. One such device is described in "Physics Today", July 1970, pages 55 and 56. The amplified coherent beam from the amplifier 24 is then passed through further expander and focuser optics at 26 and then focused onto the earth's surface as in FIG. 1.

The following currently available lasers would appear to have utility in this application:

A. Hydrofluorine chemically driven laser operating at 2.6 microns wavelength.
B. $CO_2$ laser operating at 10.6 microns wavelength.
C. Solid state lasers such as Neodymium glass operating at 1.06 microns.

The duration and/or frequency of pulses of either the laser or the fluid blast will be subject to considerable variation but as an example, both pulses could be of the order of seconds in duration.

It is contemplated that all operation characteristics of the system such as pulse length, frequency, area and diameter of annular area contacted, power input and operating wavelength of the source of coherent light are subject to continuous variation and control depending on such factors as the physical properties of the strata being bored.

In conducting a progressive earth boring operation in accordance with this invention, each core shattering and ejecting cycle being carried out by fusing the annular region surrounding the core produces a melting and flowing of the fused material tending to provide the bore wall with a smooth, glassy surface of uniform diameter. Whereas, most materials to be encountered would respond to produce the resultant smooth surfaces, special conditions may be encountered. For example, pure dry silicon sand could not be expected to respond as the fusion process would form it into fused quartz which has such a narrow temperature region of change of state that it would be difficult to manage. In such instances, impurities are introduced into the material by the injection means 19 to cause it to fuse into glass.

In the arrangements shown in FIGS. 1 and 4, the earth boring apparatus includes an electronic control means, designated generally as 22, that actuates the components in a timed sequence.

Thus, the control means includes a laser actuating section 22 A connected over line 12 L to control the laser 12; an injector actuating section 22 B connected over line 21 L to trigger the control valve 21; and a deflector actuating section 22 C connected over line 18 L to the deflector device 18.

An optical sensing means 23 is shown responsive to light reflected from a pick-up mirror 24 that is located on the center line of the beam path 17, and within the open region of the annular laser beam for detecting the distinctly different optical effects associated with the core shattering action and the core emerging action.

The sensing means 23 is connected to a processor section 22 P of the control unit 22 to provide a signal for turning off the laser when core shattering is detected. The laser pulse length is thus automatically determined in accordance with the fusion time for the physical properties of the strata being bored.

Correspondingly, the sensing means 23 operates the control unit for timing the turn-on of the deflecting device in accordance with the time that the core C exits from the hole being bored. Preferably, the control unit automatically actuates the injector device and the laser in sequence, with the injector device being operated immediately after the ejected core is clear and with the laser being actuated with sufficient delay to insure that the expansion fluid, if used, from the injector device is actually delivered to the level of the strata that is to be penetrated by the fusing action of the laser beam.

In the multiple laser embodiment of FIG. 4, it is contemplated that as many as 20 laser units are connected in ganged relation in a ring-type network to operate in sequence and are symmetrically disposed about a common center, with the nutating reflector 14 being located at the center and moved by the control means in synchronized relation to the sequential pulsing of the individual lasers for successively intercepting a beam pulse from each laser in sequence and deflecting the same into a circular pattern that is a composite of the individual beam pulses.

Thus, while preferred constructional features of the invention are embodied in the structure illustrated herein, it is to be understood that changes and variations may be made by those skilled in the art without departing from the spirit and scope of the appended claims.

What is claimed is:

1. Apparatus for boring a cylindrical hole in the earth and comprising laser means for providing a beam of high powered coherent light, focusing means above the hole for forming the beam into an annular beam traversing a downwardly directed path, fluid blast deflecting means for directing a blast that intercepts the path above the hole, and control means connected to actuate the laser means and deflecting means in sequence to provide annular beam pulses that form the hole by fusing successive annular regions of the stratum to be penetrated at a power level that shatters and self-ejects successive cores from the hole and to provide fluid blasts that deflect ejected cores.

2. Apparatus as defined in claim 1 wherein said control means includes optical sensing means for detecting ejection of a shattered core and means responsive to the optical sensing means for actuating the deflecting means in timed relation to ejection of each core.

3. Apparatus as defined in claim 1 wherein said control means includes optical sensing means for detecting shattering of a core and means responsive to the optical sensing means for effecting turn-off of the laser means whereby the length of the laser pulse is automatically determined by the physical properties of the strata being bored.

4. Apparatus as defined in claim 1 wherein said control means includes optical sensing means separately responsive for deteching shattering of each core and for detecting ejection of each shattered core, said control means including means to effect turn-off of the laser means in timed relation to the shattering of each core and means to effect turn-on of the deflecting means in timed relation to the ejection of each shattered core.

5. Apparatus as defined in claim 1 wherein said laser means provides a beam focused to a point and said focusing means includes nutating means intercepting said beam at said point for deflecting said beam in a circular pattern to constitute the annular beam.

6. Apparatus as defined in claim 1 wherein said laser means comprises a plurality of lasers symmetrically spaced about a common center, said control means includes means for pulsing the lasers in sequence, and said focusing means includes nutating means located at the common center and synchronized with the control means for sequentially intercepting the beam from each laser and deflecting the same in a circular pattern to form the annulus as a composite of the beams from the lasers.

7. Apparatus as defined in claim 1 and including fluid blast injecting means for supplying fluid to the strata to be penetrated prior to fusing thereof by the laser beam for promoting core shattering and ejection action of the beam, and wherein said control means is connected to actuate the injecting means sequentially with the laser means and deflecting means.

* * * * *